United States Patent Office 3,173,922
Patented Mar. 16, 1965

3,173,922
THERAPEUTIC AMINOALKYLOXY ARALKYL-2-MERCAPTOBENZAZOLES
Francis Frederick Stephens and Hugh Douglas Cossey, London, England, assignors to The Crookes Laboratories Limited, London, England, a British company
No Drawing. Filed June 12, 1963, Ser. No. 287,186
8 Claims. (Cl. 260—306)

This invention relates to new therapeutic derivatives of aralkyl-2-mercaptobenzazoles and more particularly to the preparation of basic ethers of such aralkyl-2-mercaptobenzazoles and to salts and quaternary ammonium compounds derived from these bases.

This work is an extension of that described in British Patent No. 825,016 wherein certain basic ethers of 2-arylbenzthiazole were described. The most useful of the basic ethers of 2-arylbenzthiazole described in British Patent No. 825,016 have been shown pharmacologically, and in such cases where the products have had clinical application, to cause photosensitization reactions such that when applied to the skin which is subsequently exposed to solar radiation there may develop an erythema. Although this irritant action is reversible and is not a serious limitation to some applications of these compounds (for example, the treatment of athletes foot) it is nevertheless undesirable and attempts have therefore been made to prepare compounds having similar therapeutic properties without this photosensitizing effect. The compounds which we wish to describe in the present invention do not, as far as extensive pharmacological tests have shown, cause photosensitization reactions of the type shown by the products described in British Patent No. 825,016.

These new therapeutic compounds have valuable medicinal properties for example anti-fungal and anti-bacterial action and are in general more active (i.e. selected members may possess greater in vitro activity against bacteria, dermatophytes and yeasts) than the best of the compounds described in British Patent No. 825,016. Furthermore, selected compounds show in vitro activity against protozoa for example 2-(3'-chloro-4'-diethylaminoethoxybenzyl mercapto)benzthiazole is active against *Trichomonas vaginalis*.

In accordance with the present invention there are provided therapeutic derivatives of aralkyl-2-mercaptobenzazoles the bases of which may be represented by the general formula:

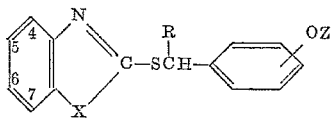

in which X is either sulphur (so giving benzthiazoles) or oxygen (so giving benzoxazoles), R represents a hydrogen atom or a lower alkyl group and Z is the alkylamine residue forming the basic ether OZ which may be substituted in the ortho, meta or para position of the phenyl ring. The alkylamine residue Z may be further defined as consisting of a group

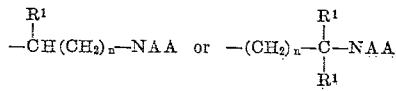

wherein R' is hydrogen or a lower alkyl group, $n$ is a small integer and A represents an alkyl group or AA may be part of a ring such that NAA represents for example a piperidino or morpholino residue. More particularly this invention describes compounds which are substitution derivatives of the above general formula in which one or more of the four vacant positions (4, 5, 6, and 7) of the benz-ring and/or the four vacant positions of the phenyl ring may be substituted by atoms or groups chosen from chlorine, bromine, iodine, methyl, methoxyl, nitro or amino.

This invention also includes therapeutic derivatives of such aralkyl-2-mercaptobenzazoles comprising acid addition salts and quaternary ammonium compounds in which the basic ether moiety (which is the centre for such salt formation) may be represented by the general formulae:

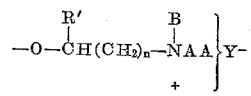

and

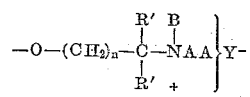

wherein B represents a hydrogen atom or an alkyl group and Y is an anion derived from an inorganic or organic acid (such as hydrochloric, hydrobromic, hydriodic, acetic, tartaric, citric, oxalic, undecylenic, sulphuric, embonic or p-toluenesulphonic acids). When B is hydrogen, such products are acid addition salts and when B is an alkyl group such products are quaternary ammonium compounds.

The bases of these compounds may be prepared by the condensation of an appropriately substituted 2-mercaptobenzazole with an appropriate basic ether of benzylchloride. Such condensations may be expediently effected by reaction of the two components in non-hydroxylic solvents such as simple aliphatic ketones for example acetone in the presence of potassium carbonate as an acid acceptor. The substituted benzyl chlorides required for this synthesis may be prepared from a hydroxybenzaldehyde which is first halogenated (in those cases where a halogen is required in the phenyl ring), then alkylated to give the basic ether, then reduced to the substituted benzyl alcohol and finally converted to the benzyl chloride; all of these steps, although in some cases leading to hitherto undescribed compounds, may be effected by known general chemical reactions. α - Alkyl-dialkylaminoalkoxybenzyl alcohols may be prepared by reaction of Grignard reagents (for example methyl magnesium bromide) with such basically substituted benzaldehydes; these basically substituted α-alkylbenzyl alcohols may be converted by reaction with thionyl chloride into α-alkyl-benzylchloride hydrochlorides which may in turn be condensed with 2-mercaptobenzazoles to give compounds of the general formula in which R=alkyl. The benzyl-2-mercaptobenzazoles obtained in this way may be converted to salts by reaction with acids or may be quaternised by reaction with known alkylating agents.

EXAMPLE 1

(a) 199.4 grams of 3-chloro-4-hydroxybenzaldehyde was added to a solution of 29.4 g. of sodium in 800 ml. absolute ethanol and the mixture boiled under reflux for 30 minutes. The ethanol was removed by evaporation, 1,000 ml. toluene was added to the solid residue and the last traces of ethanol were removed by azeotropic distillation. 264 grams of β-diethylaminoethyl chloride hydrochloride was dissolved in 500 ml. water, the solution was made alkaline with 40% sodium hydroxide solution and the precipitated base was extracted with 600 ml. of toluene. The dried toluene solution was added to the suspension of the above described sodium salt and the mixture was boiled under reflux for 24 hours. The cooled mixture was extracted with N sodium hydroxide and the toluene layer was washed with water, dried and evaporated to give a brown liquid. Distillation of this gave 300 g. of 3-chloro-4-diethylaminoethoxybenzaldehyde, B.P. 152–154° at 0.3 mm. (citrate, white crystals, M.P. 124–125° decomp. from ethanol).

(b) A suspension of 53 g. of paraformaldehyde and 300 g. of the above base in 500 ml. methanol was added during 15 minutes with stirring to a solution of 165 g. potassium hydroxide in 500 ml. methanol, the temperature being kept between 60° and 70°. The mixture was stirred at this temperature for 6 hours then the solvent was removed by distillation until the temperature of the residue reached 101°. 2.5 litres of water was added to the cooled residue and the oil which separated was extracted with benzene. The benzene extract was washed with water, dried and evaporated. Distillation of the residue gave 219 g. of 3-chloro-4-diethylaminoethoxybenzyl alcohol as a colourless liquid, B.P. 154–158° at 0.3 mm. (citrate, white crystals, M.P. 114–115° decomp. from ethanol-ether).

Alternatively, the aldehyde may be reduced to the benzyl alcohol by hydrogenation in ethanol with hydrogen at 60 atmospheres pressure at normal temperatures and in the presence of platinum oxide catalyst.

(c) 88.2 grams of the above alcohol was dissolved in 150 ml. of chloroform and treated in an ice bath with 150 ml. of thionyl chloride added over 30 minutes. The mixture was refluxed for 3 hours then the solvent was removed and the residue treated with dry ether until it solidified. The white solid was removed, washed with ether, dried and crystallised from acetone to give 3-chloro-4-diethylaminoethoxybenzyl chloride hydrochloride (82 g.) as white prisms, M.P. 116–117°.

(d) 45 grams of 2-mercaptobenzthiazole was dissolved in 1,000 ml. of acetone, 400 g. of anhydrous potassium carbonate and 83.1 g. of the above benzyl chloride hydrochloride were added and the mixture refluxed for 24 hours with stirring. The mixture was filtered, the residue washed with acetone and the filtrate evaporated to leave a brown oil. The residue was dissolved in 250 ml. of ether and the solution washed successively with N sodium hydroxide, saturated sodium bicarbonate solution and water. The dried ether solution was then evaporated to give a light brown oil which was dissolved in 150 ml. of methanol, charcoaled and the clear filtrate treated with 48 g. of citric acid. The mixture was refluxed for ½ hour, charcoaled and the hot clear filtrate treated with ether to precipitate the salt. Recrystallisation from ethanol gave 2-(3'-chloro-4'-diethylaminoethoxybenzylmercapto)benzthiazole citrate M.P. 106–107° (decomp.). The free base may be regenerated from the pure citrate and crystallises from light petroleum as white plates M.P. 39–41°. The oxalate of this base had M.P. 124–125°; the picrate, M.P. 113–113.5° and the embonate, M.P. 114–116°.

EXAMPLE 2

3 grams of 2-(3'-chloro-4'-diethylaminoethoxybenzylmercapto)benzthiazole citrate (Example 1) was decomposed with N sodium hydroxide and the free base taken into ether. The ether solution was dried, evaporated and the residual oil dissolved in 30 ml. of acetone containing 10 ml. of ethyl bromide. The solution was refluxed for 48 hours then cooled and the solid removed by filtration. Crystallisation from acetone gave 2-[2'-chloro-4'(benzthiazolyl-2''-mercaptomethyl)phenoxy]ethyl triethylammonium bromide as white needles, M.P. 139–140°.

EXAMPLE 3

1.2 grams of 4,6-dichloro-2-mercaptobenzthiazole, 1.4 g. of 4-diethylaminoethoxybenzyl chloride hydrochloride and 7.5 g. of anhydrous potassium carbonate in 25 ml. acetone was boiled under reflux for 24 hours. The inorganic solid was filtered off, washed with acetone and the filtrate evaporated. The residue was dissolved in ether and the solution washed successively with N sodium hydroxide, saturated sodium bicarbonate solution and water. The dried ether solution was evaporated and the residual oil was dissolved in 10 ml. of methanol. 0.9 gram of citric acid was added to this solution and the mixture refluxed for 15 minutes. Addition of ether to the methanol solution gave crystals of 4,6-dichloro-2(4'-diethylaminoethoxybenzylmercapto)benzthiazole citrate M.P. 117–118° (decomp.). Regeneration of the free base from this citrate gave a solid, M.P. 61–62° (from petroleum).

EXAMPLE 4

A mixture of 0.71 g. of 2-mercapto-6-nitrobenzthiazole, 1.04 g. of 3-chloro-4-diethylaminoethoxybenzyl chloride hydrochloride and 5 g. potassium carbonate in 20 ml. acetone was refluxed for 24 hours. The resulting solid was removed by filtration, washed with acetone then with water then crystallised from ligroin to give yellow needles of 2-(3'-chloro-4'-diethylaminoethoxybenzylmercapto)-6-nitrobenzthiazole, M.P. 124–125°. Reaction of this base with citric acid in methanol gave the citrate which crystallised from 50% ethanol as a cream solid, M.P. 175–175.5°. The hydrochloride crystallised from ethanol, M.P. 195–196°.

EXAMPLE 5

A mixture of 0.67 g. of 6-chloro-2-mercaptobenzthiazole, 1.14 g. of 2-chloro-4-diethylaminoethoxy-5-methoxybenzyl chloride hydrochloride and 5.5 g. of potassium carbonate carbonate was refluxed for 24 hours in 20 ml. of acetone. The crude benzylmercaptobenzthiazole was obtained in the manner described above, purified by chromatography in benzene on an alumina column and converted by reaction with citric acid into 6-chloro-2-(2'-chloro-4'-diethylaminoethoxy-5'-methoxybenzylmercapto)benzthiazole citrate which crystallised from ethanol as a cream solid, M.P. 165–166° (decomp.).

EXAMPLE 6

A mixture of 0.5 g. of 2-mercaptobenzoxazole, 1.04 g. of 3-chloro-4-diethylaminoethoxybenzyl chloride hydrochloride, 5 g. of potassium carbonate and 30 ml. of acetone was refluxed for 24 hours. The inorganic material was filtered off, washed with acetone and the filtrate evaporated. The residue was dissolved in ether, washed with 0.1 N sodium hydroxide then with water and the dried ether solution was evaporated to give the crude benzylmercaptobenzoxazole. Treatment of this base with citric acid in methanol followed by addition of ether gave 2-(3'-chloro-4'-diethylaminoethoxybenzylmercapto)benzoxazole citrate as a colourless solid M.P. 112–113°.

EXAMPLE 7

In a precisely similar manner to that in Example 6, a stoichiometric mixture of 2-mercaptobenzoxazole and 4-diethylaminoethoxybenzyl chloride hydrochloride was refluxed in acetone containing potassium carbonate to give 2-(4'-diethylaminoethoxybenzylmercapto)benzoxazole which was converted into its citrate (white crystals, M.P. 119–120°).

EXAMPLE 8

A mixture of 1 g. of 2-mercaptobenzthiazole, 1.34 g. of 2-diethylaminoethoxybenzyl chloride hydrochloride and 9 g. of potassium carbonate was refluxed in 25 ml. of acetone for 24 hours. The crude base was isolated as described above, purified by chromatography in benzene on alumina and converted, by reaction with citric acid in methanol into 2-(2'-diethylaminoethoxybenzylmercapto) benzthiazole citrate which crystallised from isopropanol as a colourless solid, M.P. 125° (decomp.).

EXAMPLE 9

Methyl magnesium iodide (prepared from 3.6 g. of magnesium and 21.3 g. of methyl iodide in 60 ml. of ether) was treated with 16.5 g. of p-diethylaminoethoxybenzaldehyde in 30 ml. of ether during 75 minutes at a temperature between 0° and 5°. After allowing the mixture to reach room temperature it was refluxed for 1 hour then decomposed by addition of 100 ml. of ice-cold water. The mixture was made strongly alkaline by addition of 40% sodium hydroxide solution, extracted with ether and the ether solution was filtered. The dry ether solution was evaporated to give an oil which on distillation gave p-diethylaminoethoxy-α-methylbenzyl alcohol, B.P. 140–142° at 0.3 mm. (citrate, M.P. 79–81°).

Conversion of this alcohol to the corresponding α-methylbenzyl chloride hydrochloride (as described in Example 1(c)) followed by condensation with 5-chloro-2-mercaptobenzthiazole (as described in Example 1(d)) gave 5 - chloro - 2 - (4' - diethylaminoethoxy - α - methylbenzylmercapto) benzthiazole citrate, M.P. 104–106° (from methanol-ether). The following compounds have be prepared in addition to those described in the above examples and as variants thereof.

*Table I.—2-benzylmercaptobenzthiazoles*

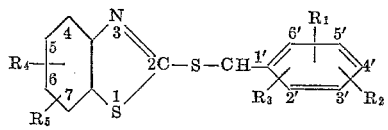

| $R_1$–$R_2$ | $R_3$ | $R_4$–$R_5$ | Salt | M.P. of Salt or Base |
|---|---|---|---|---|
| 2'-chloro | 4'-diethylaminoethoxy | hydrogen | Citrate | 141(d). |
| 3'-chloro | do | do | do | 106–7(d). |
| Do | 4'-dimethylaminoethoxy | do | do | 142–3(d). |
| Do | 4'-diethylaminopropoxy | do | do | 149–50(d). |
| Do | 4'-(2'-diethylamino-1''-methylethoxy) | do | do | 84–5(d). |
| Do | 4'-(2''-dimethylamino-2''-methylpropoxy) | do | do | 154–5(d). |
| Do | 4'-(di-n-butyl-aminoethoxy) | do | Oxalate | 124–5(d). |
| Do | 4'-morpholinoethoxy | do | Base | 84–5. |
| 3'-iodo | 4'-diethylaminoethoxy | do | Citrate | 123–4(d). |
| 3',5'-dichloro | do | do | do | 136–7(d). |
| 3'-methoxy | do | do | do | 94–5(d). |
| 2'-chloro-5'-methoxy | do | do | do | 139–9(d). |
| 3'-chloro-5'-methoxy | do | do | do | 133–3.5(d). |
| Hydrogen | 3'-diethylaminoethoxy | do | do | 129(d). |
| 2'-bromo | 5'-diethylaminoethoxy | do | do | 116.5-7.5(d). |
| 4'-chloro | 2'-diethylaminoethoxy | do | do | 154–5(d). |
| 5'-bromo | do | do | do | 134–5(d). |
| 3',5'-dichloro | do | do | do | 151.5(d). |
| Hydrogen | 4'-diethylaminoethoxy | 4-chloro | do | 103–4(d). |
| 3'-chloro | do | do | do | 115–6.5(d). |
| 3',5-dichloro | do | do | do | 144–5(d). |
| 3'-chloro | do | 5-chloro | do | 129–30(d). |
| 3',5'-dichloro | do | do | do | 144–5(d). |
| 3'-methoxy | do | do | do | 98–9(d). |
| 3'-chloro-5'-methoxy | do | do | do | 135–6(d). |
| Hydrogen | do | 6-chloro | do | 131–2(d). |
| 2'-chloro | do | do | do | 148.5(d). |
| 3'-chloro | do | do | do | 140–1(d). |
| 3'-bromo | do | do | do | 140–1(d). |
| 3'-iodo | do | do | do | 145–6(d). |
| 3',5'-dichloro | do | do | do | 134–5–135.5(d). |
| 3'-methoxy | do | do | do | 119–120(d). |
| 3'-chloro-5'-methoxy | do | do | do | 136–7(d). |
| Hydrogen | 3'-diethylaminoethoxy | do | do | 127–8(d). |
| Do | 2'-diethylaminoethoxy | do | do | 139.5(d). |
| Do | 4'-diethylaminoethoxy | 7-chloro | do | 128–9(d). |
| 3'-chloro | do | do | do | 128–9(d). |
| 3,5-dichloro | do | do | do | 106–7(d). |
| 3'-chloro | do | 4,6-dichloro | Base | 90–90.5. |
| Do | do | do | Citrate | 148–9(d). |
| 3,5'-dichloro | do | do | do | 150–151(d). |
| Hydrogen | do | 4,5-dichloro | do | 135–6(d). |
| 3'-chloro | do | do | do | 141–2(d). |
| Hydrogen | do | 4,7-dichloro | do | 114–5(d). |
| 3'-chloro | do | do | do | 122–3(d). |
| Do | do | 6-iodo | do | 128–9(d). |
| Do | do | 5-methyl | do | 126–7(d). |
| Do | do | 6-methyl | do | 117–8(d). |
| Do | do | 5-chloro-6-nitro | do | 149–50(d). |
| Do | do | 6-amino | Base | 90–90.5. |
| Do | do | do | Oxalate | 146–7(d). |
| Do | do | 6-amino-5-chloro | Base | 96–7. |
| Do | do | do | Oxalate | 137–8(d). |
| Hydrogen | do | Hydrogen | Citrate | 116–117. |
| Do | do | 5-chloro | do | 129–131. |
| 3'-bromo | do | Hydrogen | do | 106–108. |
| Do | do | 5-chloro | do | 125–127. |

What we claim is:

1. A compound selected from the group consisting of the free base, acid addition salts and quaternary ammonium salts of an aralkyl-2-mercaptobenzazole having the formula:

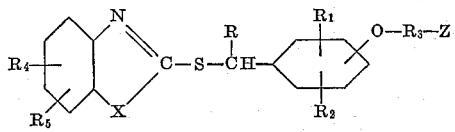

wherein:
- X is a member selected from the group consisting of sulfur and oxygen,
- R is monovalent radical selected from the group consisting of hydrogen and lower alkyl,
- $R_1$, $R_2$, $R_4$ and $R_5$ are monovalent radicals selected from the group consisting of hydrogen, halogen, methyl, methoxy, amino and nitro,
- $R_3$ is a divalent lower alkylene radical, and
- Z is a radical selected from the group consisting of di-lower alkylamino, morpholino, and piperidino.

2. 2-(di-lower alkylamino lower alkyloxybenzyl mercapto) halobenzthiazole.

3. 2 - (di - lower alkylaminoethoxybenzyl mercapto) benzthiazole.

4. 2 - (3' - bromo - 4' - diethylaminoethoxybenzyl mercapto)-6-chlorobenzthiazole.

5. 2-(halodi-lower alkylamino lower alkyloxybenzyl mercapto) benzthiazole.

6. 2 - (3' - chloro - 4" - diethylaminoethoxybenzyl mercapto) benzthiazole.

7. 2-(halodi-lower alkylamino lower alkyloxybenzyl mercapto) aminobenzthiazole.

8. 2 - (halodi - lower alkylaminoalkyloxybenzyl mercapto) halobenzthiazole.

No references cited.

NICHOLAS S. RIZZO, *Primary Examiner.*